(12) United States Patent
Ammar et al.

(10) Patent No.: US 11,901,811 B2
(45) Date of Patent: Feb. 13, 2024

(54) AC-DC POWER CONVERTER WITH POWER FACTOR CORRECTION

(71) Applicant: DANMARKS TEKNISKE UNIVERSITET, Kongens Lyngby (DK)

(72) Inventors: Ahmed Morsi Ammar, Kongens Lyngby (DK); Yasser A. A. Nour, Kongens Lyngby (DK); Arnold Knott, Kongens Lyngby (DK)

(73) Assignee: DANMARKS TEKNISKE UNIVERSITET, Kongens Lyngby (DK)

( * ) Notice: Subject to any disclaimer, the term of this patent is extended or adjusted under 35 U.S.C. 154(b) by 412 days.

(21) Appl. No.: 17/413,031

(22) PCT Filed: Dec. 11, 2019

(86) PCT No.: PCT/EP2019/084619
§ 371 (c)(1),
(2) Date: Jun. 11, 2021

(87) PCT Pub. No.: WO2020/120562
PCT Pub. Date: Jun. 18, 2020

(65) Prior Publication Data
US 2022/0014093 A1    Jan. 13, 2022

(30) Foreign Application Priority Data
Dec. 13, 2018 (EP) .................................. 18212210

(51) Int. Cl.
*H02M 1/42*    (2007.01)
*H02M 3/07*    (2006.01)
(Continued)

(52) U.S. Cl.
CPC ....... *H02M 1/4241* (2013.01); *H02M 1/0058* (2021.05); *H02M 1/425* (2013.01);
(Continued)

(58) Field of Classification Search
CPC ............... H02M 1/0058; H02M 1/425; H02M 3/33576; H02M 3/158; Y02B 70/10
See application file for complete search history.

(56) References Cited

U.S. PATENT DOCUMENTS 5,274,540 A    12/1993  Maehara
5,301,095 A *  4/1994  Teramoto .............. H02M 3/335
                                            363/21.07
(Continued)

FOREIGN PATENT DOCUMENTS

CN           104968075 A     10/2015
WO    WO 2004/028218 A1      4/2004
WO    WO 2014/063591 A1      5/2014

OTHER PUBLICATIONS

International Search Report and Written Opinion of International Searching Authority for Application No. PCT/EP2019/084619, dated Feb. 26, 2020 (12 pages).
(Continued)

*Primary Examiner* — Yusef A Ahmed
(74) *Attorney, Agent, or Firm* — Nixon Peabody LLP

(57) ABSTRACT

The present invention relates to an AC-DC power converter which includes a resonant DC-DC converter and a charge pump circuit. The charge pump circuit is configured to perform power factor correction of the AC-DC power converter by drawing current pulses at a switching frequency of the converter from an AC line voltage such that electrical charges of the current pulses vary substantially proportionally with instantaneous amplitude of the AC line voltage.

11 Claims, 12 Drawing Sheets

(51) Int. Cl.
*H02M 3/335* (2006.01)
*H02M 1/00* (2006.01)

(52) U.S. Cl.
CPC ............ *H02M 3/07* (2013.01); *H02M 3/335* (2013.01); *H02M 3/33576* (2013.01)

(56) References Cited

U.S. PATENT DOCUMENTS

| | | | | |
|---|---|---|---|---|
| 6,046,914 | A * | 4/2000 | Lauter | H02M 1/4241 363/125 |
| 6,636,430 | B1 * | 10/2003 | Batarseh | H02M 1/4258 363/21.01 |
| 6,724,644 | B2 * | 4/2004 | Loef | H02M 3/3376 363/17 |
| 8,649,189 | B2 | 2/2014 | Tang | |
| 2002/0191428 | A1 * | 12/2002 | Loef | H02M 3/3376 363/98 |
| 2010/0060179 | A1 * | 3/2010 | Newman, Jr. | H05B 41/295 315/219 |
| 2012/0287678 | A1 | 11/2012 | Xu | |
| 2016/0020693 | A1 | 1/2016 | Ribarich | |
| 2017/0339765 | A1 * | 11/2017 | Barnetson | H05B 45/395 |
| 2019/0393770 | A1 * | 12/2019 | Deng | H02M 3/33571 |
| 2023/0253876 | A1 * | 8/2023 | Ammar | H02M 1/4208 363/21.03 |

OTHER PUBLICATIONS

Extended European Search Report for European Patent Application No. 18212210.1, dated Jun. 12, 2019 (9 pages).
Yamauchi, T. et al.; "A Novel Charge Pump Power Factor Correction Electronic Ballast for High Intensity Discharge Lamps"; Power Electronics Specialists Conference, 1998; PESC 98 Record, 29th Annual IEEE, Fukuoka, Japan; May 17-22, 1998, New York, New York; IEEE, U.S. vol. 2, pp. 1761-1767; XP010294830; DOI: 10.1109/PESC.1998.703420; ISBN: 978-0-7803-4489-1 (7 pages).
Chen, W. et al.; "An Improved 'Charge Pump' Electronic Ballast with Low THD and Low Crest Factor"; APEC '96, 11th Annual Applied Power Electronics Conference and Exposition, Mar. 3-7, 1996, San Jose, California; IEEE Transactions on Power Electronics, vol. 12, No. 5, pp. 867-875; Sep. 1997 (9 pages).
Yijie Wang et al.; "A Single-Stage Single-Switch LED Driver Based on Class-E Converter"; 0093-9994, copyright 2015 IEEE; DOI: 10.1109/TIA.2016.2519324 (9 pages).
Chen, W. et al.; "An Improved 'Charge Pump' Electronic Ballast with Low THD and Low Crest Factor"; APEC '96, 11th Annual Applied Power Electronics Conference and Exposition, Mar. 3-7, 1996, San Jose, California; IEEE Transactions on Power Electronics, U.S. vol. 2, pp. 622-627; Mar. 3, 1996; XP000585906; ISBN: 978-0-7803-3045-0 (6 pages).

* cited by examiner

AC-DC POWER CONVERTER WITH POWER FACTOR CORRECTION

CROSS-REFERENCE TO RELATED APPLICATIONS

This application is a US. National Stage of International Application No. PCT/EP2019/084619, filed Dec. 11, 2019, which claims the benefit of European Patent Application No. 18212210.1, filed Dec. 13, 2018, both of which are incorporated herein by reference in their entireties.

FIELD OF THE INVENTION

The present invention relates to an AC-DC power converter which comprises a resonant DC-DC converter and a charge pump circuit. The charge pump circuit is configured to perform power factor correction of the converter by drawing current pulses at a switching frequency of the converter from an AC line voltage such that electrical charges of the current pulses vary substantially proportionally to instantaneous amplitude of the AC line voltage.

BACKGROUND OF THE INVENTION

The present AC-DC power converters may be applied to power factor correcting AC-DC power converters in numerous applications. A high power factor is generally required or at least highly desirable in a power delivery system to reduce power losses and reduce distortion introduced to the AC grid by input current harmonics. In case the power system is loaded by a nonlinear load, e.g. switching converter, current drawn by the load is interrupted by a switching activity and therefore contains numerous higher frequency components that are multiples of the power system frequency. Such harmonic distortion reduces average power transferred to a load of the AC-DC power converter in addition to contaminating the AC grid. Power factor correction brings the power factor of a power circuit closer to 1 by making the load appear more resistive to the AC grid. Thus, achieving a close-to-sinusoidal line current that is substantially proportional to, and substantially in-phase with, the AC grid-voltage.

The skilled person will understand that the AC-DC power converters disclosed herein may be utilized in a wide range of applications and product categories, including laptop chargers, LED drivers, other adapters and power supplies for various industrial and consumer electronics. Thus, the AC-DC power converters disclosed herein meet an increasing demand for smaller, more power or energy efficient and longer living AC-DC converters. The present AC-DC power converter design solves these and other problems by a charge pump based Power Factor Correction (PFC). The present AC-DC converter may for example use soft-switching inverter topologies and state-of-the-art devices such as wide bandgap semiconductors and relevant magnetic materials as discussed below in additional detail.

With the current trend towards smaller and highly portable electronic equipment for consumer and industrial applications it is important to minimize weight and size of the equipment without sacrificing performance. One application of the present AC-DC converter with a great demand for miniaturization is offline power converters. Conventional offline converters are 2-stage architectures wherein the first stage is an AC-DC power factor correction (PFC) rectifier followed by an energy storage capacitor to filter the double-the-line frequency component on the output, while the second stage is a DC-DC converter providing the voltage and current levels con-forms to load electrical characteristics. This conversion has to comply with a number of regulations dictating the shape of the input current to limit the mains voltage distortion [1], [2].

Pulse-width-modulated (PWM) converters have been the primary candidate for the AC-DC stage in offline converters, including step-down converters, step-up converters, buck-boost converters, flyback converters and single-ended primary-inductor converter (SEPIC). These prior art converter topologies can provide high power fac-tor, but generally suffer from several pronounced problems such as high conducted electromagnetic interference (EMI) from rectangular switching waveforms. Another problem associated with prior art converter topologies is hard-switching operation which typically leads to severe switching losses, low overall energy efficiency, severe EMI problems, relatively low switching frequencies and voltage stress, dv/dt, problems etc.

On the other hand, resonant inverters and converters typically have substantially lower switching losses than their PWM counterparts. The resonant inverters of AC-DC power converters in accordance with the present invention may therefore be configured to provide zero-voltage-switching (ZVS) and/or zero-current-switching (ZCS) to provide high power conversion efficiencies at high switching frequencies for example switching frequencies above 750 kHz or above 1 MHz. That in turn results in reduced sizes of passive electrical components and thus higher power densities, higher loop-gain bandwidths and faster transient responses. The resonant inverters and converters typically allow incorporation of high frequency transformers in the resonant tank or circuit. The latter allows galvanic isolation, in addition to offering different output voltages. That, in turn, can help combine the AC-DC with the following DC-DC stage for a single-stage solution for the present offline converters.

SUMMARY OF THE INVENTION

A first aspect of the invention relates to an AC-DC power converter which comprises an AC rectification circuit configured to convert an AC line voltage into a rectified line voltage and a rectifying element connected between the rectified line voltage and a DC supply voltage of a resonant DC converter. The resonant DC converter comprises a resonant inverter configured to convert the DC supply voltage into a resonant inverter voltage at a fixed or controllable switching frequency and an output rectification circuit configured to generate a DC output voltage from the resonant voltage or generate a DC output current from the resonant voltage for supply to a converter load such as an LED lamp assembly. The AC-DC power converter additionally comprises a charge pump circuit connected to the rectified line voltage and the resonant inverter voltage. The charge pump circuit is configured to draw current pulses at the fixed or controllable switching frequency from the AC line voltage wherein electrical charges of the current pulses vary proportionally to, or at least substantially proportionality to, an instantaneous amplitude of the AC line voltage.

The skilled person will understand that the charge pump circuit may operate in an open loop manner and therefore does not require any separate regulation loop or mechanism to carry out the power factor correction of the line current drawn from the AC line voltage or mains voltage. Hence, the AC-DC power converter may comprise merely a single feedback regulation loop to adjust the DC output voltage or DC output current despite the integrated power factor correction (PFC) mechanism pro-vided by the charge pump circuit. The AC-DC power converter may for example comprise a voltage or current regulation loop configured to adjust the DC output voltage or DC output current in accordance with a DC reference voltage or a DC reference current. The adjustment of the DC output voltage or DC output current may be achieved by controlling the switching frequency of the resonant inverter, which is also the switching frequency of the resonant DC-DC converter, as discussed in additional detail below with reference to the appended drawings.

Other embodiments of the AC-DC power converter may have a substantially fixed switching frequency and the adjustment of the DC output voltage or DC output current may be achieved by duty cycle control, i.e. on/off control, of the switch control signal which may be PWM modulated.

The resonant inverter may comprise a series resonant network or tank, a parallel resonant network or tank or a combination of both. In each case, the resonant network or tank may comprise at least an inductor and a capacitor to set a resonance frequency. The resonance frequency may lie between 100 kHz and 300 MHz, for example above 750 kHz, and tuned to coincide with the switching frequency of the resonant DC-DC converter, which therefore also may lie between 100 kHz and 300 MHz. The skilled person will understand that properties of active components of the AC-DC power converter, such as transistors, and passive components, such as the inductor and capacitor of the resonant network, to may be tailored to a specific switching frequency or switching frequency range.

The skilled person will understand that the resonant inverter may have any of numerous well-known topologies such as a topology selected from the group {class E, class F, class DE, class EF, LLC}. Some embodiments of the AC-DC power converter may comprise a galvanic isolation barrier, e.g. a transformer with a certain conversion ratio, to step-up or step-down the resonant inverter voltage. The trans-former may provide galvanic isolation between primary side circuitry and secondary side circuitry of the AC-DC power converter. The galvanic isolation barrier may be coupled between the resonant output voltage and an input voltage of the output rectification circuit.

According to one embodiment of the AC-DC power converter, the charge pump circuit comprises a smoothing capacitor connected to the DC supply voltage of the resonant inverter and a pump capacitor, or flying capacitor, connected from the resonant inverter voltage to the rectified line voltage. The circuit topology of the AC-DC power converter ensures that the charge variation of the pump capacitor, which is proportional to the voltage variation across the pump capacitor, follows the AC line voltage across the Hz line cycle. Accordingly, the average input or line current drawn by the AC-DC power converter substantially follows the AC line voltage and a unity power factor can ideally be obtained even though minor component and circuit imperfections may leave the power factor slightly below unity. The charge pump circuit may be configured such that the proportionality between the electrical charges of the current pulses and the instantaneous amplitude of the AC line voltage leads to a power factor exceeding 0.95, and more preferably exceeds 0.98, for example exceeding 0.99 as evidenced by the experimental results discussed in detail below with reference to the appended drawings.

According to certain embodiments of the invention, the electrical interconnection between the rectified line voltage and resonant inverter voltage is based on a capacitor only network, for example exclusively by the pump capacitor. This provides a compact and low-cost connection that may be based on standard, low cost and readily available capacitors. The electrical interconnection may therefore avoid the use of an inductive coupling or an inductive component of the below-discussed galvanic isolation transformer, such as a separate transformer winding, back to the rectified line voltage.

The charge pump circuit may be configured to, during a cycle of the switching frequency, sequentially cycle through states of:
  a first state where each of the rectifying element ($D_p$) and AC rectification circuit ($D_B$) is non-conducting/off and a voltage across the pump/flying capacitor ($C_p$) remains substantially constant;
  a second state where AC rectification circuit (DB) is conducting/on and the rectifying element ($D_p$) is non-conducting/off to charge the pump/flying capacitor ($C_p$) by line current drawn from the AC line voltage;
  a third state where each of the rectifying element ($D_p$) and AC rectification circuit ($D_B$) is non-conducting/off and the voltage across the pump/flying capacitor ($C_p$) remains substantially constant;
  a fourth state where the AC rectification circuit ($D_B$) is in a non-conducting/off state and the rectifying element ($D_p$) is in a conducting/on state such that discharge current flows from the pump/flying capacitor (Cr) into the smoothing capacitor ($C_{PC}$) to increase the DC supply voltage ($V_{DC}$) of the resonant inverter and decrease the voltage across the pump/flying capacitor ($C_p$).

The charge pump circuit may be configured to cycle through its second state during a rising edge of a waveform of the resonant inverter voltage; and cycle through its fourth state during a falling edge of the waveform of the resonant inverter voltage as discussed in additional detail below with reference to the appended drawings.

According to one embodiment, a capacitance of the smoothing capacitor and a capacitance of the pump/flying capacitor are selected such that the DC supply voltage of the resonant inverter is higher than the AC line voltage across every cycle of the AC line voltage. An advantage of the latter selection of respective capacitances of the smoothing capacitor and pump capacitor is that it prevents cross conduction between AC line voltage source and the DC supply voltage ($V_{DC}$) of the resonant DC-DC converter.

The AC-DC power converter preferably comprises a voltage regulation loop or current regulation loop configured to adjust the DC output voltage ($V_{OUT}$) or DC output current, respectively, in accordance with a DC reference voltage or a DC reference current. The voltage or current regulation loop may be configured to:
  adjust the DC output voltage or DC output current by adjusting or controlling the switching frequency, i.e. frequency modulation control, and/or
  adjust the DC output voltage (Vou-r) or DC output current by off/on modulation or duty cycle modulation of the switching frequency. Hence, in the latter embodiment, the switching frequency of AC-DC power converter may be fixed and the AC-DC power converter turned-on and turned-off at a certain control frequency.

According to one embodiment, the voltage or current regulation loop may be configured to adjust the switching frequency of the AC-DC power converter with more than +/−5%, or even more than +/−10%, relative to a nominal switching frequency of the AC-DC power converter. The nominal switching frequency may be identical to the resonance frequency of the resonant network or a predetermined off-set relative to resonance frequency of the resonant network.

The resonant inverter preferably comprises at least one semiconductor switch connected between the DC supply voltage ($V_{DC}$) and a negative supply rail. The at least one semiconductor switch may comprise one or more wide bandgap transistors such as one or more gallium nitride FET(s). The resonant inverter may comprise controllable switch network such as a half-bridge driver comprising a pair of wide bandgap transistors. A switch signal, at the fixed or controllable switching frequency, may be applied to a control terminal, e.g. a gate terminal, of the least one semiconductor switch of the resonant inverter. An output terminal of the controllable switch network may be connected to a first end of the resonant network.

The resonant inverter may comprise a controllable switch network exhibiting a topology selected from a group of: class DE, Class E, class EF, LLC.

The resonant inverter may be configured for zero voltage switching (ZVS) and/or zero current switching (ZCS). The output rectification circuit of the DC-DC converter may be configured for zero voltage switching (ZVS) and/or zero current switching (ZCS).

The output rectification circuit of the DC-DC converter may comprise one or more passive diodes, such as silicon carbide Schottky diode(s), or one or more active/controllable diodes such as one or more transistors such as at least one MOSFET.

A second aspect of the invention relates to a method of applying power factor correction to an AC-DC power converter using a charge pump circuit, said method comprising steps of:
  converting an AC line voltage into a rectified line voltage ($V_B$);
  applying the rectified line voltage ($V_B$) to a DC supply voltage ($V_{DC}$) of a resonant DC-DC converter through a rectifying element (Dr), such as a semiconductor diode;
  generating a resonant inverter voltage by switching a resonant inverter at a fixed or controllable switching frequency;
  rectifying the resonant inverter voltage to generate a DC output voltage or generate a DC output current;
  drawing charging pulses, at the switching frequency, from the AC line voltage into a pump or flying capacitor (CO connected between the rectified line voltage ($V_B$) and the resonant inverter voltage, wherein electrical charges of the charging pulses vary substantially proportionally to an instantaneous amplitude of the AC line voltage; —discharging the pump or flying capacitor into a smoothing capacitor, connected to the DC supply voltage, by supplying current pulses, at the switching frequency, into the smoothing capacitor.

The skilled person will understand that present methodology may comprise that the charge pump circuit sequentially cycles through the previously discussed first, second, third and fourth states during every cycle of the switching frequency.

BRIEF DESCRIPTION OF THE DRAWINGS

A preferred embodiment of the invention will be described in more detail in connection with the appended drawings, in which.

DETAILED DESCRIPTION OF PREFERRED EMBODIMENTS

Figure 1:
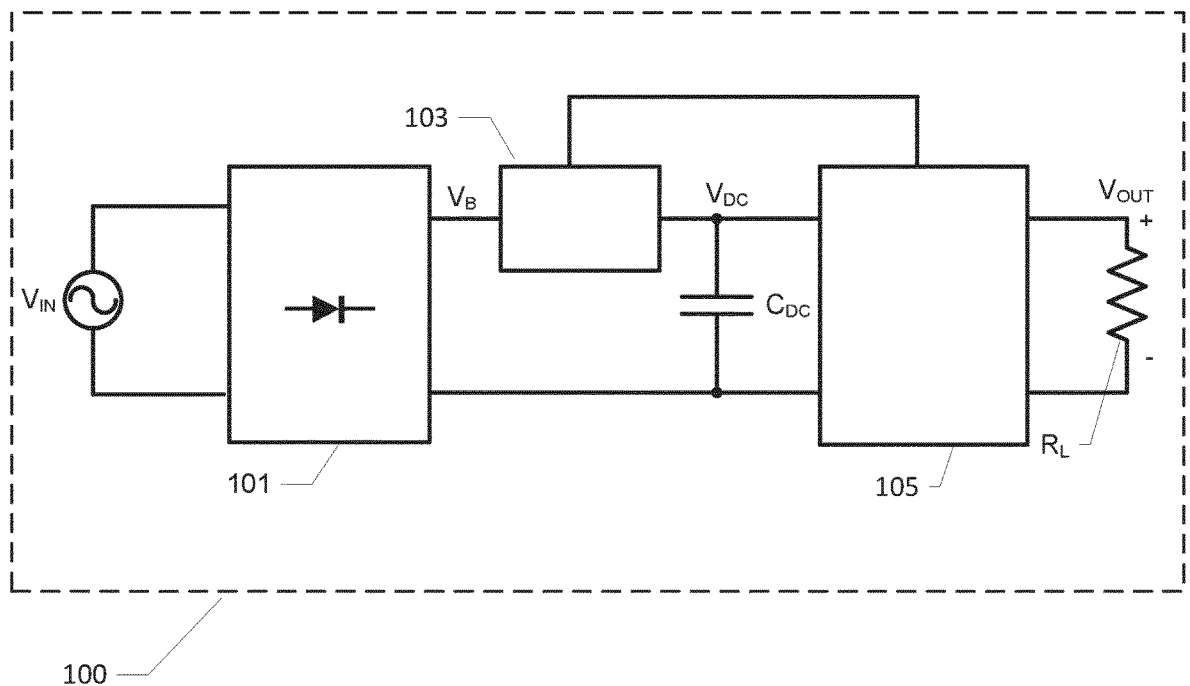
FIG. 1 is a top-level block diagram of AC-DC power converters in accordance with the invention.

In the following, various exemplary embodiments of the present AC-DC power converter are described with reference to the appended drawings. The skilled person will understand that the accompanying drawings are schematic and simplified for clarity and therefore merely show details which are essential to the understanding of the invention, while other details have been left out. Like reference numerals refer to like elements or components throughout. Like elements or components will therefore not necessarily be described in detail with respect to each figure. It will further be appreciated that certain actions and/or steps may be described or depicted in a particular order of occurrence while those skilled in the art will understand that such specificity with respect to sequence is not actually required.

FIG. 1 shows a simplified block diagram of the present AC/DC power converter 100. The AC/DC power converter 100 comprises an AC rectification circuit (101) which is coupled to an AC line voltage ($V_{IN}$) which may deliver AC mains voltages like 230 V/50 Hz or 110V/60 Hz. The AC rectification circuit (101) may include a mains input filter as illustrated below. The AC rectification circuit (101) is configured to convert the AC line voltage $V_{IN}$ into a rectified line voltage ($V_B$). The AC/DC power converter 100 additionally comprises a charge pump circuit (103), which preferably included a smoothing capacitor ($C_{PC}$), and class DE resonant converter (105). The smoothing capacitor ($C_{PC}$) is connected to the DC supply voltage ($V_{DC}$) of the resonant inverter (101). The resonant converter (105) is configured to convert the DC supply voltage ($V_{DC}$) firstly into a resonant inverter voltage (illustrated below) at a fixed or adjustable switching frequency. Secondly, an output rectification circuit (not shown) of the resonant converter (105) generates a DC output voltage ($V_{OUT}$) of the AC/DC power converter 100 by rectifying the resonant inverter voltage. A schematically illustrated converter load ($R_L$), such as a LED lamp assembly, is connected to the DC output voltage ($V_{OUT}$). The converter load may generally exhibit inductive, capacitive or resistive impedance. The charge pump circuit (103) is configured to perform power factor correction (PFC) of the AC/DC power converter 100 by drawing charging pulses from the AC line voltage where electrical charges of the charging pulses vary substantially proportionally with an instantaneous amplitude of the AC line voltage as discussed in additional detail below.

Figure 2:
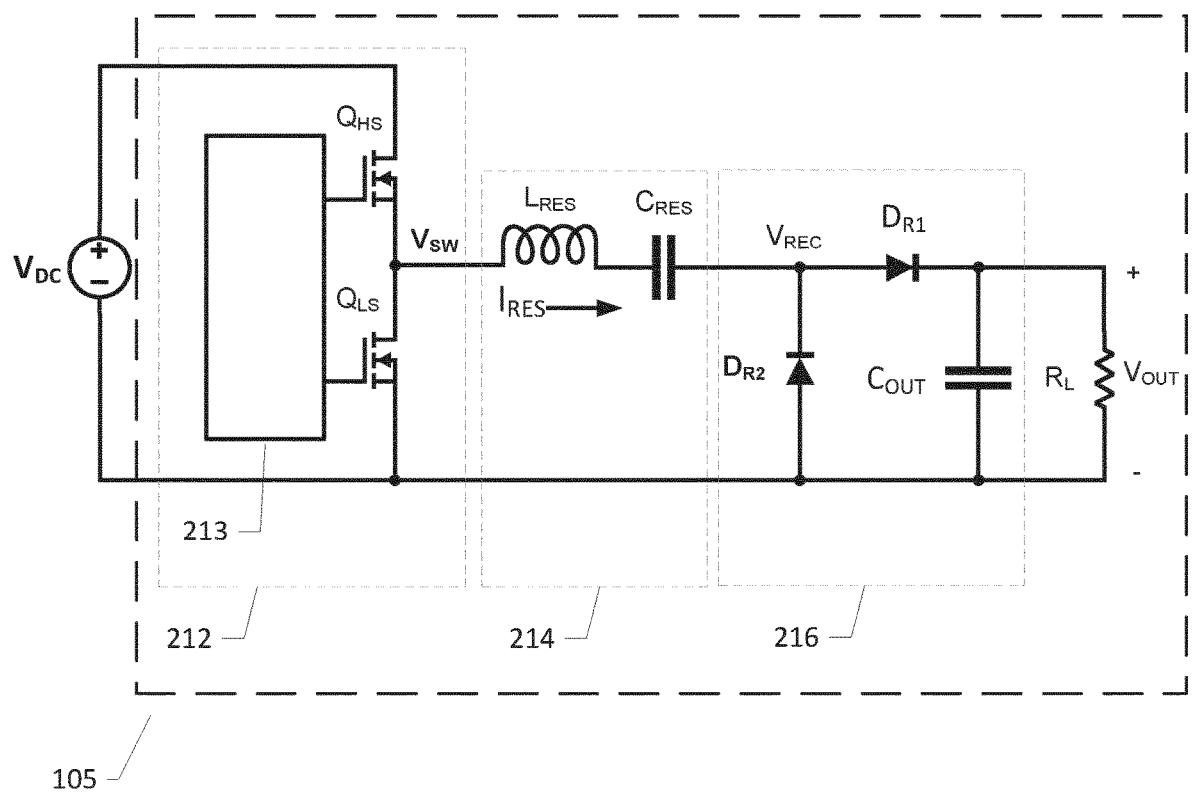
FIG. 2 is a simplified electrical circuit diagram of a class-DE series resonant converter of the AC-DC power converter.
Figure 2A:
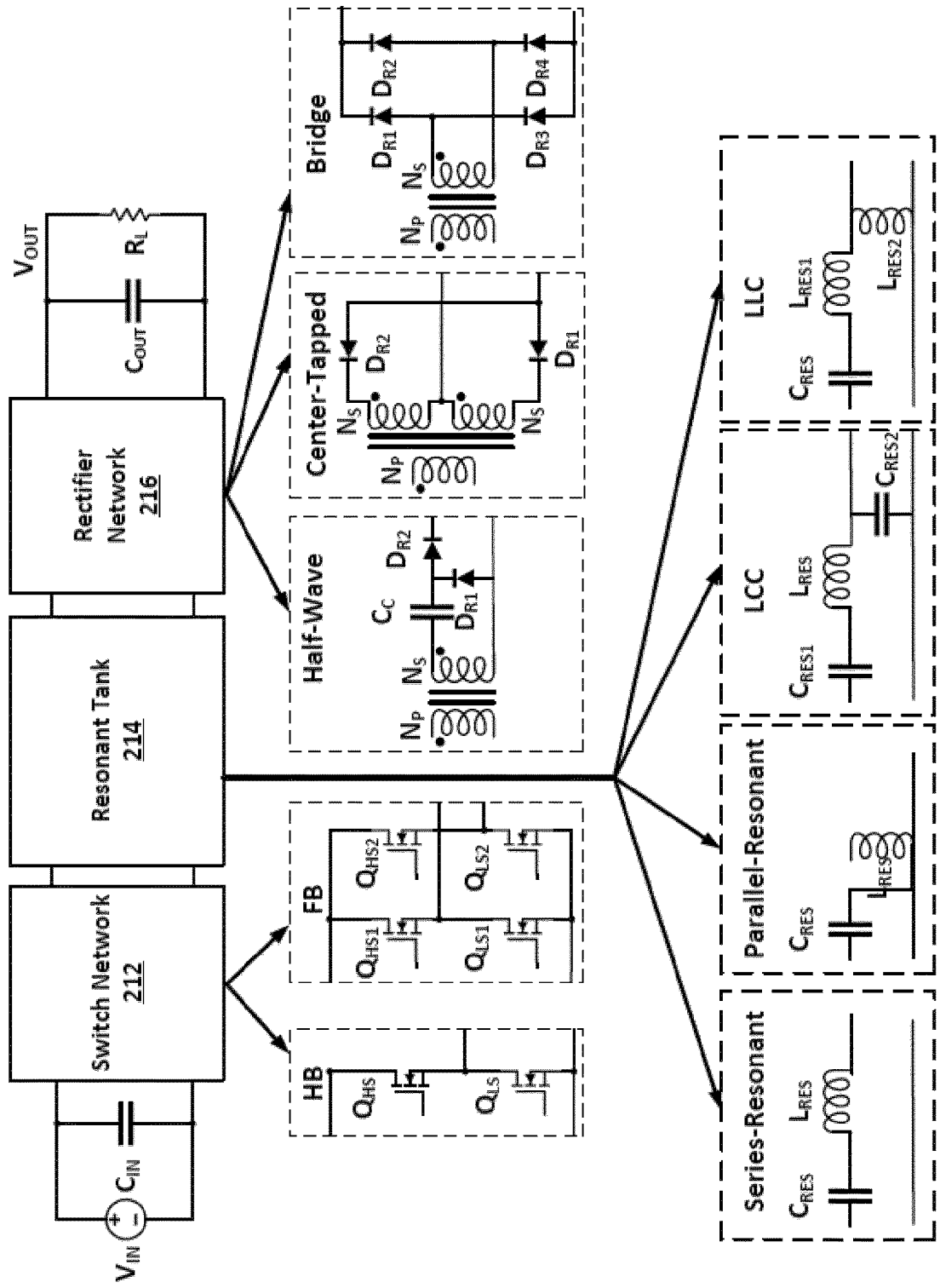
FIG. 2A shows block diagrams of various exemplary embodiments of AC-DC power converters in accordance with the invention.

FIG. 2 shows a simplified electrical circuit diagram of the resonant class DE power converter (105). The class DE power converter comprises a controllable switch network 212, a series resonant tank or network (214) comprising an inductor LREs and a capacitor CRES. The skilled person will understand that other types of resonant tanks or tank circuits (214) may be used in alternative embodiments of the present AC/DC power converters as schematically illustrated on FIG. 2A. The class DE power converter comprises the previously discussed rectifier or rectification circuit 216. The skilled person will appreciate that alternative resonant power converter topologies such as Class E or LLC topologies may be employed in the present AC/DC power converter 100. The controllable switch network 212 is connected to positive and negative terminals or nodes of the DC supply voltage ($V_{DC}$) to energize the converter 105. The resonant class DE power converter 105 typically comprises of two stages, wherein the first stage comprises the controllable switch network 212 and the resonant tank 214. The controllable switch network 212 converts a DC voltage input from the DC supply voltage ($V_{DC}$) into a high frequency AC output, i.e. the resonant inverter voltage $V_{REC}$ and the series resonant tank 214 may perform an AC-AC gain. The second stage of the resonant converter 105 comprises the high frequency AC-DC rectification circuit 216 wherein energy/power supplied by the series resonant tank may be tapped off and delivered to the converter/output load ($R_L$). The rectification circuit 216 may comprise SiC Schottky diodes $D_{R1}$ and $D_{R2}$ as discussed in additional detail below. The skilled person will understand that other types of AC-DC rectification circuits 216 may be used in alternative embodiments of the present AC/DC power converters, including rectification circuits that include an isolation transformer such as an center-tapped isolation transformer as schematically illustrated on FIG. 2A.

The utilization of a resonant power converter (105) allows utilization of soft-switching techniques through the intrinsic alternating behaviour of the currents and voltages through high-side and low-side semiconductor switches $Q_{HS}$ and $Q_{LS}$ of the half-bridge 212, or controllable switch network, resulting in substantially lower switching losses. Driving signals (not shown) to the gate driver 213 are preferably synchronized with the same duty cycle and extended dead-time adjustment to avoid cross conduction between the semiconductor switches $Q_{HS}$ and $Q_{LS}$ switches and allow the resonant inductor current to charge or discharge the output capacitance of the half-bridge switches $Q_{HS}$ and $Q_{LS}$ so that their drain voltages reach the appropriate supply rail voltage before switching the gate. Therefore, ensuring zero voltage switching (ZVS) operating conditions of the half-bridge 212.

As discussed below in connection with the design of the charge pump stage, a gain of the class DE resonant inverter or stage should preferably be relatively high, e.g. a gain from about 0.5 to 1 to provide high power factor and low total harmonic distortion (THD) of the AC input current waveform. The inventors have found that a good approximation would be to design for 300 V of DC output voltage and assuming an input DC voltage to the half-bridge equal to the peak of the mains input voltage, e.g. 325 V. The design is preferably based on the well-known First Harmonic Approximation (FHA) approach even though alternative procedures may be used. The computation procedure or flow for an exemplary design of the AC/DC power converter with a target output power of 50 W may start by calculating a rectifier input resistance $R_{REC}$ from the load resistance $R_L$ through impedance transformation via the resonant rectifier as follows:

$$R_L = \frac{V_{OUT}^2}{P_{OUT}} = 1.8\,k\Omega \tag{1}$$

$$R_{REC} = \frac{2R_L}{\pi^2} = 365\,\Omega \tag{2}$$

The converter voltage conversion ratio is equal to:

$$M_V = V_{OUT}/V_{IN} = 0.923 \tag{3}$$

While gains of the half-bridge 212 and class-DE rectifier are equal to 0.45 and 2.22 respectively, the required gain of the series resonant tank 214 can be calculated by:

$$M_{V\,RES} = \frac{M_V}{M_{V\,HB}M_{V\,REC}} = 0.924 \tag{4}$$

The converter loaded quality factor is calculated using the following equation:

$$Q_L = \sqrt{\frac{\frac{1}{M_{V\,RES}^2} - 1}{f_n - \frac{1}{f_n}}} \tag{5}$$

where $f_n$ is the normalized switching frequency, equal to $f_{sw}/f_o$, —with $f_o$ being a resonant frequency of the series resonant tank 214. In order to ensure the validity of the above equations given the FHA approach, the loaded quality factor $Q_L$ of the resonant tank or circuit 214 needs to be high enough so that the resonant inverter current through the resonant tank 214 is substantially sinusoidal. A loaded quality factor of 2.5 is chosen for this design [5]. Using equation (5) to calculate the normalized switching frequency, and for a switching frequency of 1 MHz, the resonant frequency is calculated to 921 kHz. Therefrom, the resonant circuit component values may be calculated as:

$$L_{RES} = \frac{Q_L R_{REC}}{W_O} = 157 \mu H \quad (6)$$

$$C_{RES} = \frac{1}{W_O Q_L R_{REC}} = 190 pF \quad (7)$$

Rectifier devices stresses are calculated as follows:

$$V_{D\,max} = V_{OUT} = 300 \text{ V} \quad (8)$$

$$I_{D\,max} = \pi I_{OUT} = 524 \text{ mA} \quad (9)$$

A voltage stress across the half-bridge switches:

$$V_{S\,max} = V_{IN} = 325 \text{ V} \quad (10)$$

The current stresses of the half-bridge semiconductor switches $Q_{HS}$ and $Q_{LS}$ and components of the series resonant network may be calculated from:

$$I_{RES\,max} = \pi P_{OUT} \left( \frac{2}{n V_{IN\,pk}} + \frac{1}{V_{OUT}} \right) \quad (11)$$

Figure 3:
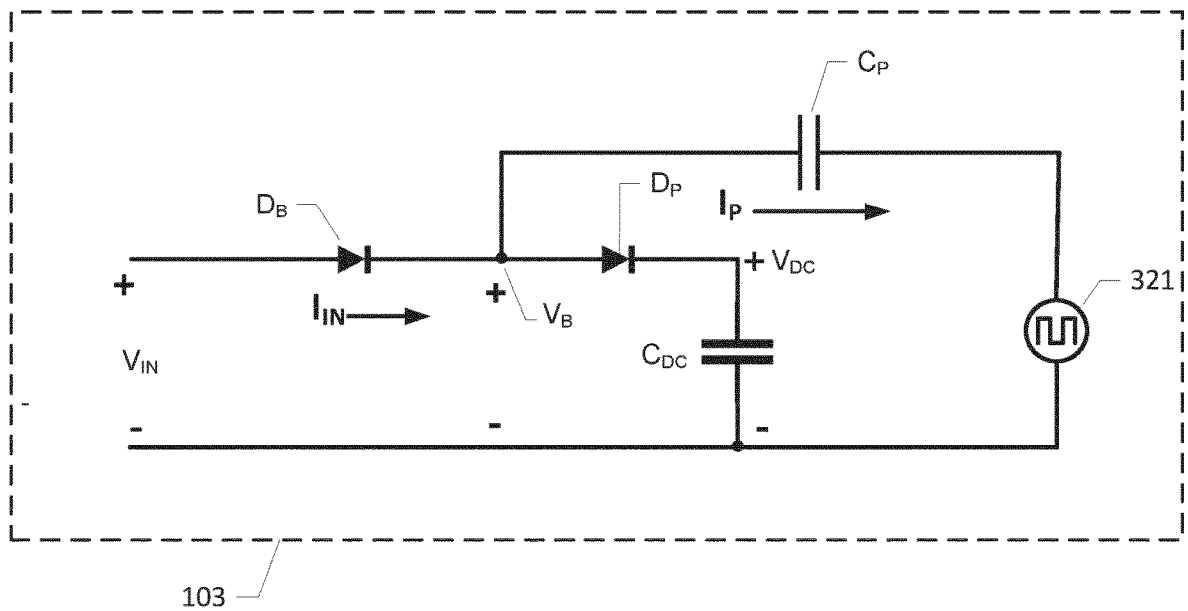
FIG. 3 is a simplified equivalent diagram of the charge pump circuit of the AC-DC power converter.

FIG. 3 shows a simplified electrical equivalent circuit or diagram of an exemplary charge pump circuit 103 of the present AC-DC power converter 100. Through the addition of a capacitor, a diode and the previously discussed smoothing capacitor ($C_{DC}$) to the resonant converter (105), mains input current drawn from the AC line voltage can be regulated to be substantially proportional to the instantaneous AC line voltage. The present embodiment of the resonant converter (105) comprises a series-resonant inverter circuit in conjunction with and a high-frequency rectification circuit to support LED driver applications. The smoothing capacitor ($C_{DC}$), or DC energy storage capacitor, is arranged at the converter input. The illustrated electrical equivalent circuit of the charge pump circuit 103 comprises a pump or flying capacitor $C_P$ and pump diode $D_P$. The AC rectification circuit (101) is schematically represented by diode $D_B$ and the rectifier input voltage ($V_{REC}$) is modelled by an independent high frequency square-wave voltage source 321. The capacitor $C_{DC}$ is preferably designed in accordance with the pump capacitor $C_p$, such that the DC supply voltage $V_{DC}$ for power supply of the resonant inverter is always higher than the AC line voltage $V_{IN}$ such that the AC rectification circuit DB and the pump diode $D_p$ do not cross-conduct. Consequently, the input current IN drawn from the AC line voltage is equal to a positive charging current $I_P$ of the pump capacitor $C_P$. In other words the capacitance of the smoothing capacitor ($C_{DC}$) and the capacitance of the pump/flying capacitor ($C_p$) are selected such that the DC supply voltage $V_{DC}$ is higher than the AC line voltage across an entire cycle of the AC line voltage as discussed in additional detail below.

First, the pump/flying capacitor ($C_P$) is preferably large enough to store a maximum input charge from the AC mains, which input charge is function of the output power, the peak input voltage and the switching frequency of the power converter. Those constraints ensure the pump capacitor ($C_P$) can store the maximum charge needed. This maximum charge occurs at the peak input current and voltage:

$$C_P \geq \frac{2 P_{OUT}}{n f_s V_{IN\,pk}^2} \quad (12)$$

Second, the capacitance of the smoothing capacitor ($C_{DC}$) is preferably dimensioned such that the voltage across it, which may correspond to the DC supply voltage ($V_{DC}$) of the resonant inverter is higher than the AC line voltage, or mains input voltage, across the entire cycle of the AC line voltage at least during steady state operation of the power converter 100. That constraints ensures the AC rectification circuit ($D_B$) or diode bridge and the pump diode ($D_P$) do not conduct at the same time. Hence, avoiding a direct current flow from the AC line voltage to the smoothing capacitor ($C_{DC}$) and therefore providing control on the input current, which has to flow through the pump capacitor $C_P$.

$$C_{DC} \geq \frac{P_{OUT}}{2 w_l V_{DC\,ripple} V_{DC\,avg}} \quad (13)$$

As mentioned before, the class-DE stage is preferably designed with a high voltage gain (close to unity) which markedly reduces the dependence of the input current on the voltage across the smoothing capacitor ($C_{DC}$) and the output voltage and makes it a function of only the AC input voltage under steady state operation of the power converter 100.

Figure 5:
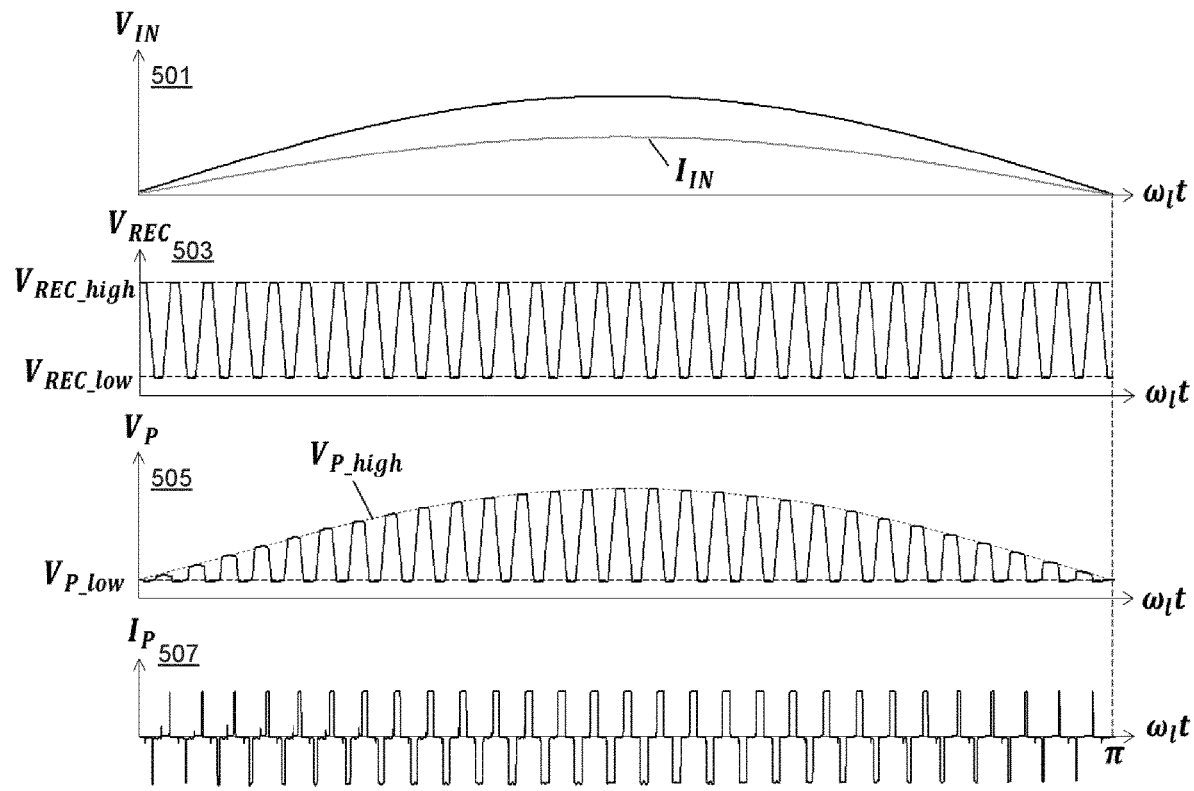
FIG. 5 shows low-frequency operation of the charge pump circuit across a half-line cycle, 50 Hz, of the mains line voltage inputted to the AC-DC power converter.

FIG. 5 shows low-frequency operation of the charge pump circuit 103, where the pump capacitor ($C_P$) gets charged and discharged within fall and rise times of the rectifier input voltage $V_{REC}$, respectively. The electrical charge $\Delta Q_P$ is largely proportional to a voltage difference across the pump capacitor $C_P$ and this voltage difference varies between a low-frequency high-value $V_{p\,high}$ and a constant low-value $V_{p\,low}$ as indicated on the waveform plot 505. The circuit ensures that the electrical charge variation of pump capacitor $C_p$, which is proportional to the voltage variation across $C_p$, i.e. $V_{P\_high} - V_{P\_low}$, follows, or varies proportionally with, the AC line voltage $V_{IN}$ across the line cycle Hz. Accordingly, the average of the mains line current $I_{IN}$ follows or tracks instantaneous amplitude of the AC mains line voltage with high accuracy and consequently a power factor very close to unity can ideally be obtained. Experimental results described below illustrates that an impressively high power factor in the range 0.95-0.99 is readily obtainable.

The skilled person will appreciate that the rectifier input voltage $V_{REC}$ can be any kind of waveform with a substantially constant AC amplitude and that any DC bias of the rectifier input voltage $V_{REC}$ has no effect on the line input current shape. This feature provides compatibility with different arrangements of the resonant tank circuit including the parallel-resonant, LCC, and LLC tank topologies or circuit arrangements.

Figure 6:
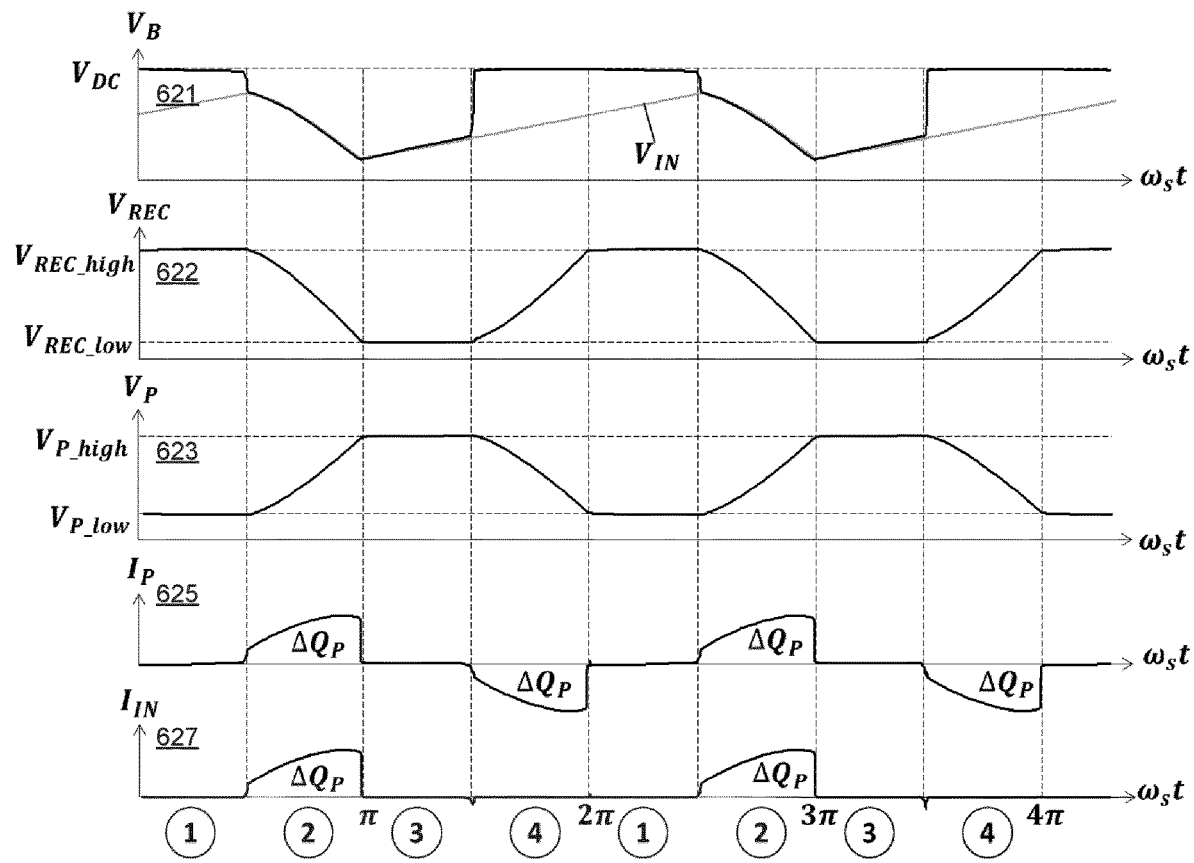
FIG. 6 illustrates high frequency operation of an exemplary embodiment of the AC-DC power converter across two switching cycles of the switching frequency of the class DE resonant converter.

FIG. 6 illustrates high frequency operation across two switching cycles of the switching frequency of the class DE resonant converter (105) and includes inter alia waveforms of the charging current $I_p$ and mains line current $I_{IN}$ showing the AC-DC converter operation at a maximum power point (wt=π/2) to illustrate the charge pump circuit operation. The maximum power point corresponds to a resonant frequency of the series resonant tank. Across every switching cycle, at steady-state, the operation of the charge pump circuit spans over four intervals 1, 2, 3 and 4 or states as indicated along the time axis of the waveform plots on FIG. 6, as follows:

1) In a first interval, the rectified line voltage $V_B$ as shown on plot 621 is lower than the DC supply voltage $V_{DC}$ and higher than the line input voltage $V_{IN}$ where the $V_{IN}$ waveform refers to the voltage on the node interfacing the LC-mains filter and the diode bridge $D_B$ so both diodes are off and no current flows through the pump capacitor $C_p$ and the voltage $V_P$ as shown on plot 623 is essentially constant at $V_{p\ low}$.

2) A second interval or states takes place during the fall time of the rectifier input voltage $V_{REC}$ as shown on plot 622. Once $V_{REC}$ starts to decrease, $V_B$ has to decrease along until diode $D_B$ gets forward biased and the rectified line voltage $V_B$ gets pulled to $V_{IN}$. While $V_{REC}$ continues decreasing while $V_B$ remains substantially constant, because the 50/60 Hz grid frequency varies much slower, e.g. with a factor 1000 or more, than the switching frequency of $V_{REC}$, $V_P$ increases and the pump capacitor $C_p$ is charged by the mains line current $I_{IN}$ as shown on plot 627, until $V_{REC}$ reaches its low-value and $V_P$ reaches its high-value, where:

$$V_{P\ high} = V_{IN} - V_{REC\ low} \quad (20)$$

3) A third interval or state begins once $V_{REC}$ settles at the low-value, where $C_p$ stops charging while diode $D_P$ still remains non-conducting or blocking. Similar to the first interval, no current flows through the pump capacitor and the voltage across the pump capacitor $C_p$ remains substantially constant.

4) Eventually, a fourth interval or state takes place during a rise time of $V_{REC}$. Once $V_{REC}$ starts to increase, $V_B$ is forced increase along until pump diode $D_P$ gets forward biased or conducting and $V_B$ is pulled to the DC supply voltage $V_{DC}$. While $V_{REC}$ (622) continues increasing, with DC supply voltage $V_{DC}$ constant, $V_P$ decreases and pump capacitor $C_p$ deliver a discharge current into the smoothing capacitor $C_{DC}$ to increase the DC supply voltage $V_{DC}$ and decrease the voltage across pump capacitor $C_p$ until $V_{REC}$ reaches its high-value, $V_{REC}$ high, and $V_P$ reaches its low-value, where $$V_{P\ low} = V_{DC} - V_{REC\ high} \quad (21)$$

By the end of the fourth interval, the operation of the charge pump circuit reverts to interval or state 1) again and the cycle repeats.

This analysis shows that the mains line current IN on plot 627 is discontinuous. The positive charging current $I_p$ on current waveform plot 625 is likewise discontinuous and only flows into the charge pump circuit during the second interval or state. As illustrated by the current waveform plot 627 of the mains line current IN on FIG. 6, a charging current pulse having the electrical charge $\Delta Q_P$ is drawn from the AC mains line voltage during every interval 2 period and the electrical charge $\Delta Q_P$ varies substantially proportionally with the instantaneous amplitude of the AC line voltage. As illustrated by the current waveform plot 625 of the pump capacitor current $I_p$ on FIG. 6, a corresponding charging current pulse, possessing an electrical charge $\Delta Q_P$, is drawn into the pump capacitor $C_p$ during every interval 2) state. However, a corresponding charging current pulse is drawn out of the pump capacitor $C_p$ during every interval 4) state and that electrical charge is supplied into the smoothing capacitor $C_{DC}$ to increase the DC supply voltage $V_{DC}$.

Figure 4:
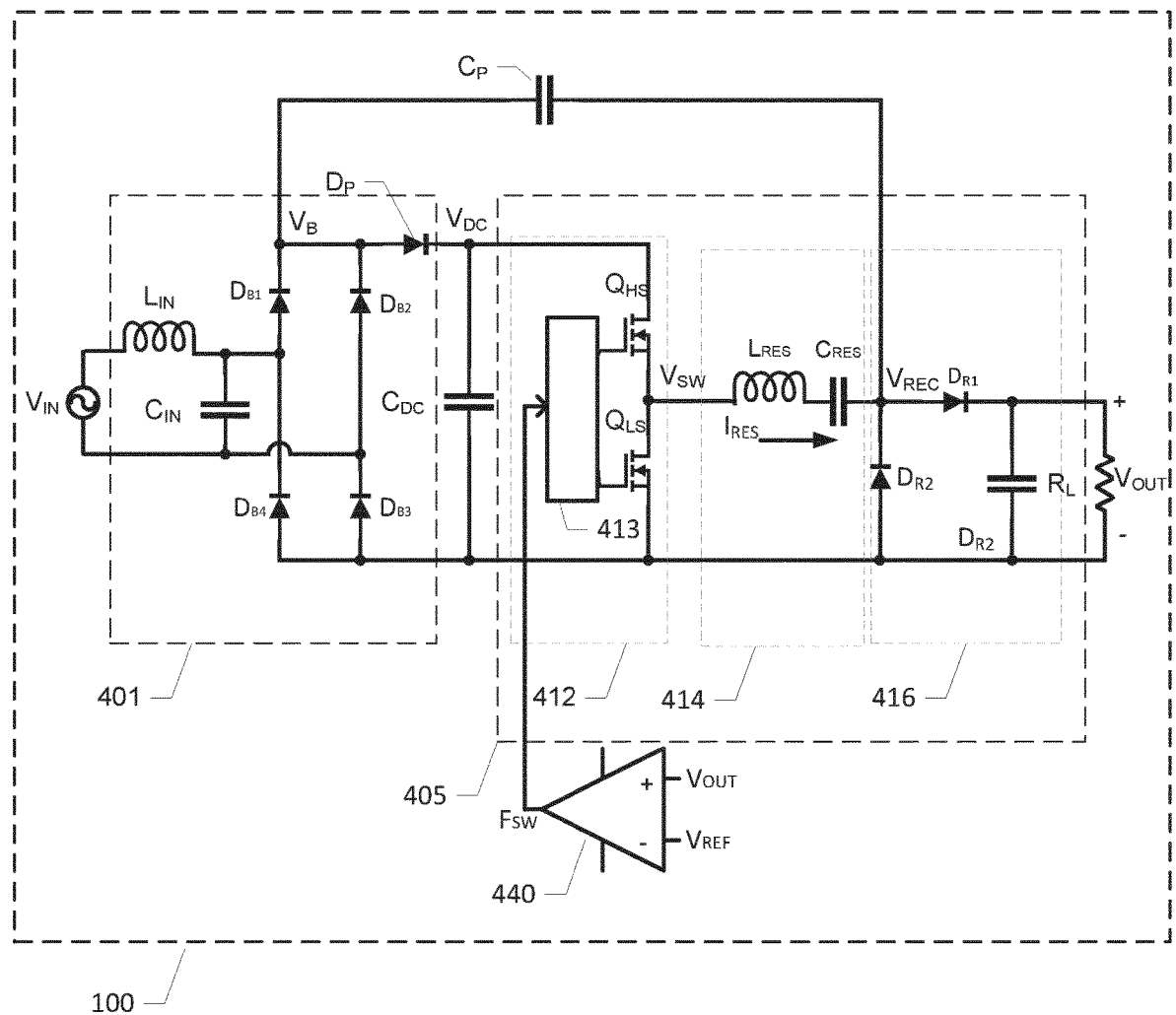
FIG. 4 is a simplified electrical diagram of a first exemplary embodiment of the AC-DC power converter based on a class-DE converter and a charge-pump circuit.

FIG. 4 is a schematic electrical diagram of a first exemplary embodiment of the previously discussed AC-DC power converter 100 based on a class-DE series resonant inverter as schematically illustrated on FIG. 2. The AC-DC power converter 100 comprises an optional mains input filter including inductor LIN and capacitor $C_{IN}$ inserted between the mains voltage and the AC rectification circuit 401 which may comprise a diode bridge as illustrated. A class DE resonant inverter is configured to convert the DC supply voltage $V_{DC}$ into the resonant inverter voltage $V_{REC}$ at a fixed or adjustable switching frequency. The class DE resonant inverter 405 comprises high-side and low-side semiconductor switches $Q_{HS}$ and $Q_{LS}$ which are driven in a non-overlapping manner by gate driving circuit 413. The gate driving circuit 413 may comprise a digital isolator, such as Si8610BC by Silicon Labs, and an off-the-shelf type of gate driver such as UCC27611 by Texas Instruments, for each of the semiconductor switches $Q_{HS}$ and $Q_{LS}$. The output voltage $V_{sw}$ of the half-bridge driver comprising high-side and low-side semiconductor switches $Q_{HS}$ and $Q_{LS}$ is applied to a series resonant tank 414 to produce a flow of resonant current $I_{RES}$ through the tank and a resonant inverter voltage $V_{REC}$ at the output of the tank 414.

The switching frequency or duty cycle may be adjusted or controlled by an output current or output voltage regulation loop or mechanism. The output current or output voltage regulation loop may comprise a switching frequency controller 440 or alternatively a duty cycle controller, i.e. using on/off control of the converter. One input of the controller 440 may be coupled to the output voltage $V_{OUT}$ while another input is coupled to a voltage or current reference generator (not shown) which sets a target output voltage $V_{REF}$ or target output current of the AC-DC power converter 100. The frequency controller 440 generates a switch control signal $F_{sw}$ to an input of the gate driver 413 to adjust the switching frequency of the class DE resonant inverter 405 such that a target DC output voltage ($V_{OUT}$) or target DC output current is achieved as discussed in additional detail below in connection with experimental results of a prototype AC-DC power converter. The AC-DC power converter 100 additionally comprises a high frequency AC-DC rectification circuit 416 which is configured to generate the DC output voltage (($V_{OUT}$) to the converter/output load ($R_L$) by tapping off energy/power supplied by the series resonant tank 414 of the class DE inverter.

The AC-DC power converter 100 additionally comprises a charge pump circuit operating according to the principles discussed in connection with FIG. 3 above and which performs the previously discussed advantageous power factor correction (PFC) of the AC-DC power converter 100. The charge pump circuit comprises pump or flying capacitor $C_p$, a smoothing capacitor $C_{DC}$ and pump diode $D_P$. The rectifier input voltage which is equal to $V_{REC}$ is applied at the junction node between output rectification diodes $D_{R1}$, and $D_{R2}$. The pump or flying capacitor $C_p$ is connected between the rectified line voltage $V_B$ and the rectifier input voltage $V_{REC}$ which is equal to the resonant inverter voltage produced by the class DE resonant inverter.

Table I shows target specifications of the AC-DC power converter 100 according to one embodiment:

TABLE 1

| Parameter | Specification |
| --- | --- |
| Operational Voltage | 230 $V_{RMS}$ |
| Line Frequency | 50 Hz |
| Output Power | 50 W |
| Power Factor | >0.9 |

The charge pump circuit 103 (FIG. 3) is preferably designed such that the capacitance of the pump capacitor $C_p$ is large enough to store a maximum input current coming from the offline mains voltage. From the analysis above and considering that for a series-resonant converter, the resonant inverter voltage $V_{REC}$ varies between $V_{OUT}$ and 0 V and can be evaluated as follows:

$$V_{P\ high} = V_{IN} - V_{REC\ low} = V_{IN} - 0 = V_{IN} \quad (11)$$

$$V_{P\ low} = V_{DC} - V_{REC\ high} = V_{DC} - V_{OUT} \quad (12)$$

The equations (11), (12) show that the high values for the voltage across the pump capacitor $C_p$ take the envelope of the input voltage, while the low values take the envelope of the difference between the resonant converter's input and output voltages, which can be considered constant in high frequency converters.

Across one switching cycle, the variation of charge in the pump capacitor is equal to:

$$\Delta Q_P = C_P \cdot \Delta V_P = C_P (V_{P\ high} - V_{P\ low}) = C_P (V_{IN} - V_{DC} + V_{OUT}) \quad (13)$$

The pump capacitor current $I_p$ when averaged across one switching cycle is equal to:

$$I_P = \frac{\Delta Q_P}{T_s} = f_s \cdot \Delta Q_P = f_s \cdot C_P (V_{IN} - V_{DC} + V_{OUT}) \quad (14)$$

Considering the class-DE inverter stage operates near resonance with a high gain close to 1, the difference between the DC supply voltage $V_{DC}$ and $V_{OUT}$ will be very small. Therefore, at steady state, for a constant switching frequency, the pump capacitor current or charging current $I_p$ and, accordingly mains line current $I_{IN}$, become proportional to the input voltage, i.e. line voltage, of the AC-DC converter, resulting in a high power factor and low THD. In that case, the maximum current through the pump capacitor (averaged over a switching cycle) will be equal to the maximum input current, which can be calculated as follows. Assuming 90% converter efficiency, the average input power is equal to:

$$P_{IN\ avg} = \frac{P_{OUT\ avg}}{n} = 55.5\ W \quad (15)$$

Assuming a power factor of 1, the input power is the product of two sinusoids, resulting in a peak input power of:

$$P_{IN\ max} = 2 P_{IN\ avg} = 111\ W \quad (16)$$

Accordingly, the maximum mains line current $I_{IN}$ or input current is:

$$I_{IN\ max} = \frac{P_{IN\ max}}{V_{IN\ max}} = \frac{111\ W}{325\ V} = 342\ mA = I_{p\ max} \quad (17)$$

By substituting those values in equation (14), the capacitance for the pump capacitor $C_p$ can be calculated as follows:

$$C_P = \frac{I_{p\ max}}{f_s V_{IN\ max}} = \frac{342\ mA}{1\ MHz * 325\ V} = 1.06\ nF \quad (18)$$

The value for $C_p$ can be adjusted to account for the DE inverter stage gain not being exactly 1 ($V_{DC} - V_{OUT} \neq 0$). In this design, a value of 1.3 nF is chosen. Whereas the maximum voltage seen by the pump capacitor $C_p$ is equal to:

$$\Delta V_{P\ max} = V_{IN\ max} = 325V \quad (19)$$

Figure 7:
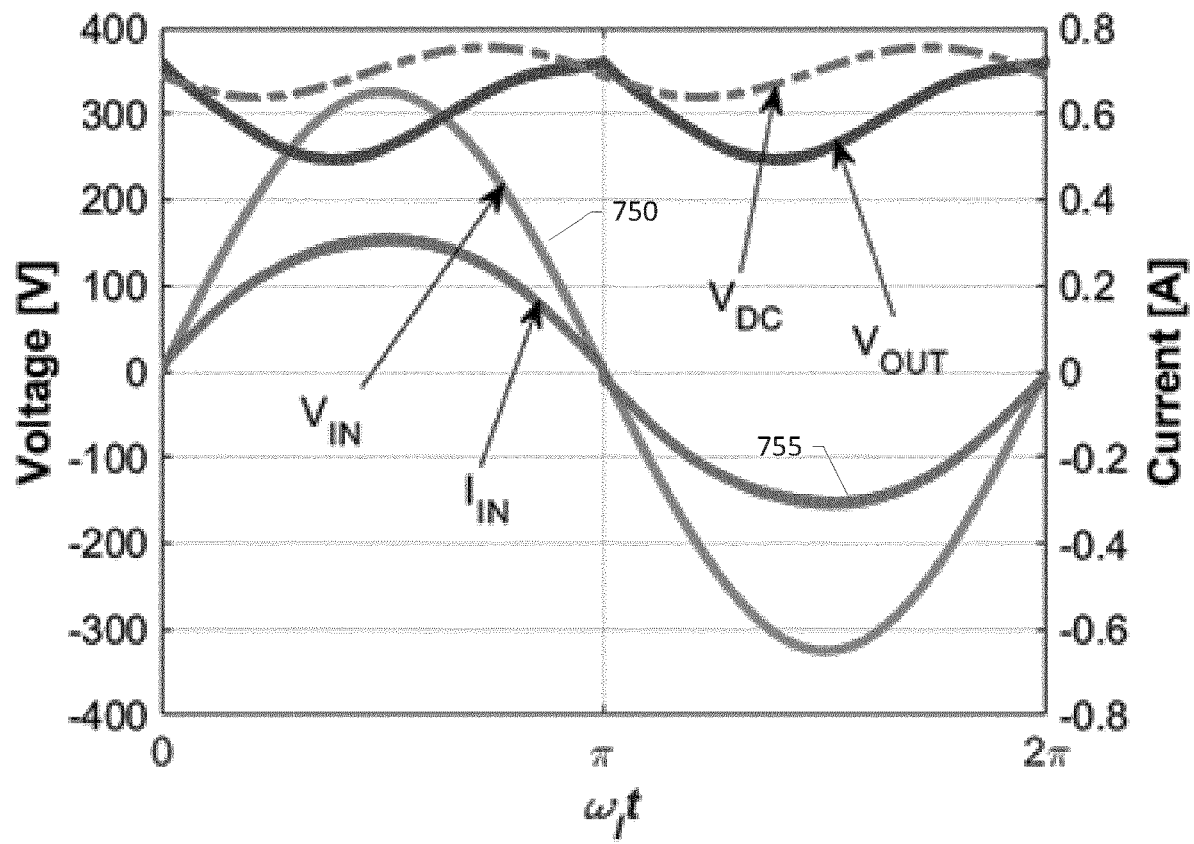
FIG. 7 shows simulation results for the mains line current and mains voltage input of the exemplary embodiment of the AC-DC power converter.

Based on the analysis and calculations outlined above, the exemplary embodiment of the present AC-DC power converter was simulated using LTspice. The switching frequency is set to 1.04 MHz for the simulation. The output power delivered to the converter load is 51 W and an average output voltage of 301V. The power factor is determined to about 0.99 and total harmonic distortion (THD) of the mains line current is 5.4%. FIG. 7 shows a mains line voltage waveform 750 of 230 $V_{RMS}$, 50 Hz inputted to the AC-DC converter for the LTspice circuit simulation. A current waveform 755 of the corresponding the mains line current $I_{IN}$ 7 drawn by the AC-DC converter is also shown. It is evident that that the mains line current $I_{IN}$ is largely in-phase with the mains line voltage and distortion of the current waveform is relatively low.

Figure 8:
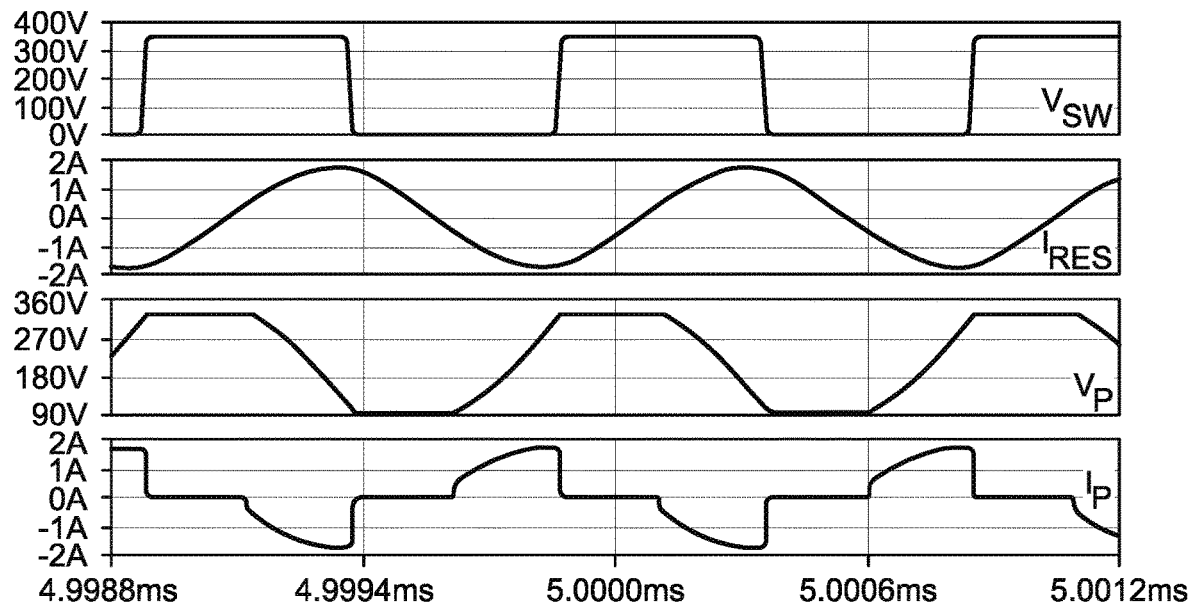
FIG. 8 shows simulated waveforms of various internal voltages and currents of the exemplary embodiment of the AC-DC power converter.

Due to the charge pump circuit operation, the current in the resonant tank 414 peaks to the same value as pump capacitor current $I_p$, which takes place at the peak of the input power (wft=π/2,3π/4). The current in the resonant tank 414 is further a function of the switching frequency, the output power, and a shape of the $V_{REC}$ waveform. The value is obtained from the simulation results, as shown in FIG. 8, which indicates that the resonant inductor current peaks to about 1.7 A. This is also the maximum value of pump capacitor current I p at the maximum output power of the AC-DC power converter.

Table II below summarizes specifications for the design of an exemplary inductor LRES of the series resonant tank (214) which are obtained from the circuit analysis and simulation results as described above.

TABLE II

| Parameter | Specifications |
| --- | --- |
| Inductance | 156 µH |
| Current Frequency | 1 MHz |
|  | Sinus-old |
| Current Amplitude | 1.7 A |

Figure 10:
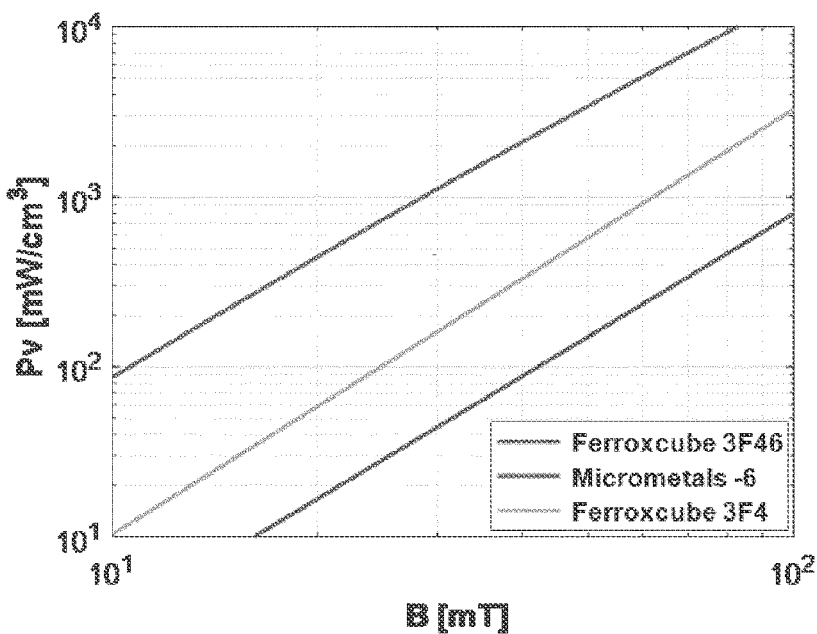

When handling high frequency AC currents, a key factor to the inductor design is choosing the right core material. Several magnetic materials [6][7] are investigated and compared in terms of core losses at 1 MHz, as shown in Table II and FIG. 10, wherein the 3F46 material (Ferroxcube) may be chosen as it shows the lowest core losses at the design operating conditions.

The following equation was used to estimate the inductor core loss. The peak flux density in the core can be calculated from:

$$B_{pk} = \frac{1}{N} \cdot \frac{I_{pk} L}{A_e} \quad (22)$$

where N is the number of turns, $I_{pk}$ is the amplitude of the resonant current, L is the inductance, and $A_e$ is the effective core area. Considering that the core loss is a function of the peak flux density for a chosen material, the loss for a given number of turns and core size can be estimated. The following calculation of the DC resistance of the windings gives an estimate of the winding losses.

The total cross-sectional area of the windings may be calculated from:

$$A_c = n_{wires} \cdot \pi \cdot r_{wire}^2 \quad (23)$$

where $n_{wires}$ is the number of strands of Litz wire and $r_{wire}$ is the wire radius. The DC resistance may then calculated from:

$$R_{dc} = P_{cu} \cdot \frac{MLT \cdot N}{A_c} \qquad (24)$$

where $p_{cu}$ is the copper resistivity and MLT is the mean length of turn. For an EFD 25/13/9 core size, with two parallel layers of 20*0.05 mm Litz wire, the DC resistance is 8.6 mΩ N. Next, AC resistance of the windings is calculated. The skin effect is negligible when using Litz wire at 1 MHz, but the proximity effect can have a significant influence on the closely wound wires. Modelling the AC resistance to be three times larger than the DC resistance estimates the winding losses to $$P_{cu} = R_{ac} \cdot 1_{rms}^2 = 3 \cdot R_{dc} \cdot \frac{1_{pk}^2}{2} = 37 \, mW \cdot N \qquad (25)$$

Based on these estimates, the inductor is designed with 52 turns, which helps distribute the losses evenly between the core and the windings and results in acceptable total losses. An airgap of 1.2 mm, distributed across the three legs of the core, adjusted the desired inductance.

Figure 4A:
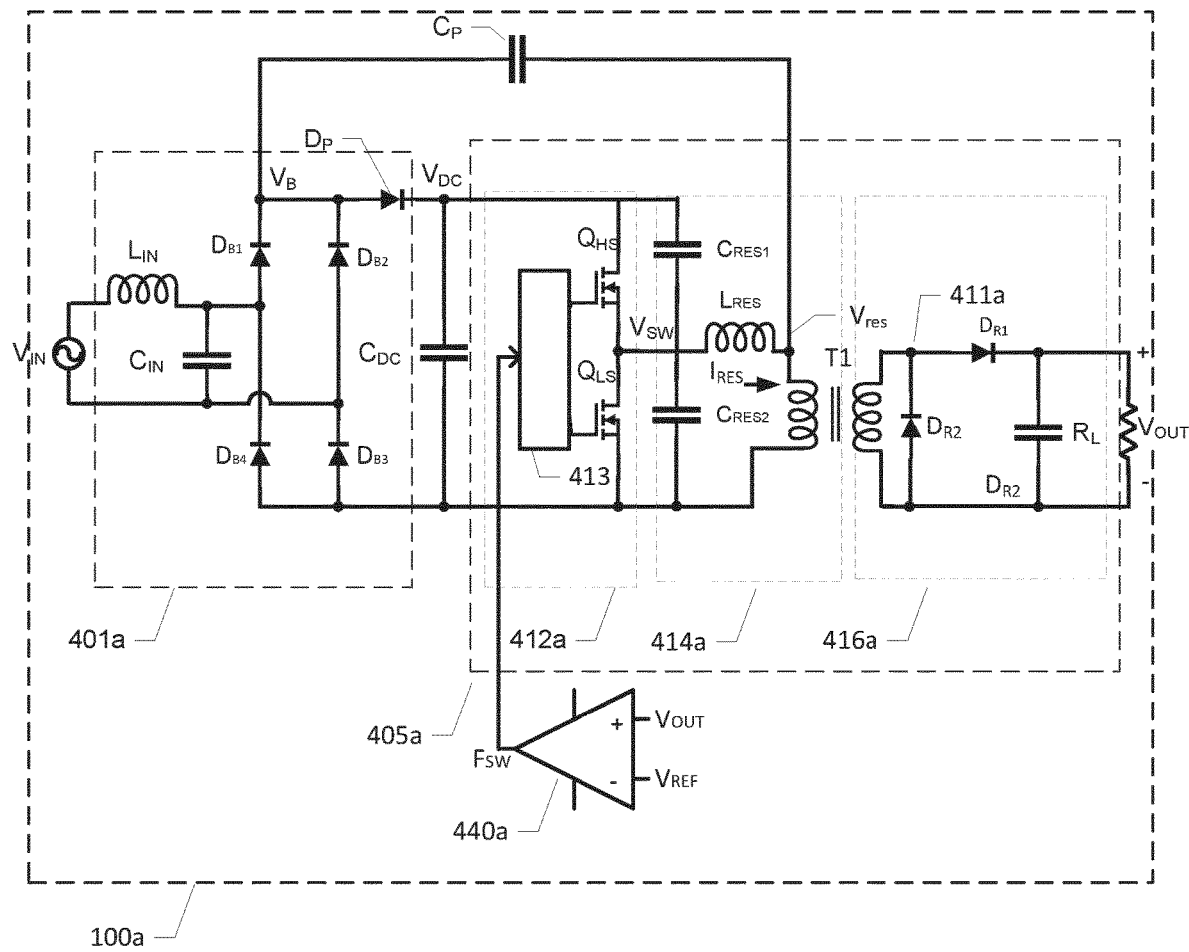
FIG. 4A is a simplified electrical diagram of a second exemplary embodiment of the AC-DC power converter based on a class-DE converter and a charge-pump circuit.

FIG. 4A is a schematic electrical diagram of a second exemplary embodiment of the previously discussed AC-DC power converter 100a based on class-DE resonant inverter. Compared to the previously discussed first exemplary embodiment of the AC-DC power converter on FIG. 4, the present AC-DC power converter 101 additionally comprises a transformer T1 (no denotation) with a certain voltage conversion ratio to step-up or step-down the resonant inverter voltage $V_{res}$. The transformer T1 provides galvanic isolation between primary side circuitry and secondary side circuitry of AC-DC power converter 100a and is coupled between the resonant output voltage $V_{res}$ and an input node 411a of the output rectification circuit 416a connected to diodes $D_{R1}$ and $D_{R2}$. As discussed above in connection with non-isolated AC-DC power converter 100a, the charge pump circuit comprises a pump capacitor $C_p$, a smoothing capacitor $C_{DC}$ and pump diode D. The pump capacitor $C_p$ is connected between the rectified line voltage $V_B$ and the resonant inverter voltage $V_{REC}$ produced by the class DE resonant inverter. Preferably, the electrical interconnection between the rectified line voltage $V_B$ and resonant inverter voltage $V_{REC}$ is based on capacitor only network, for example exclusively including the pump capacitor $C_p$. This provides a compact and low-cost connection that may be based on standard, low cost and readily available capacitors as discussed below. Hence, the electrical interconnection between the rectified line voltage $V_B$ and resonant inverter voltage $V_{REC}$ is therefore preferably carried out without the use of any inductive coupling or component from the isolation transformer, T, such as a separate transformer winding, back to the rectified line voltage $V_B$.

Figure 9:
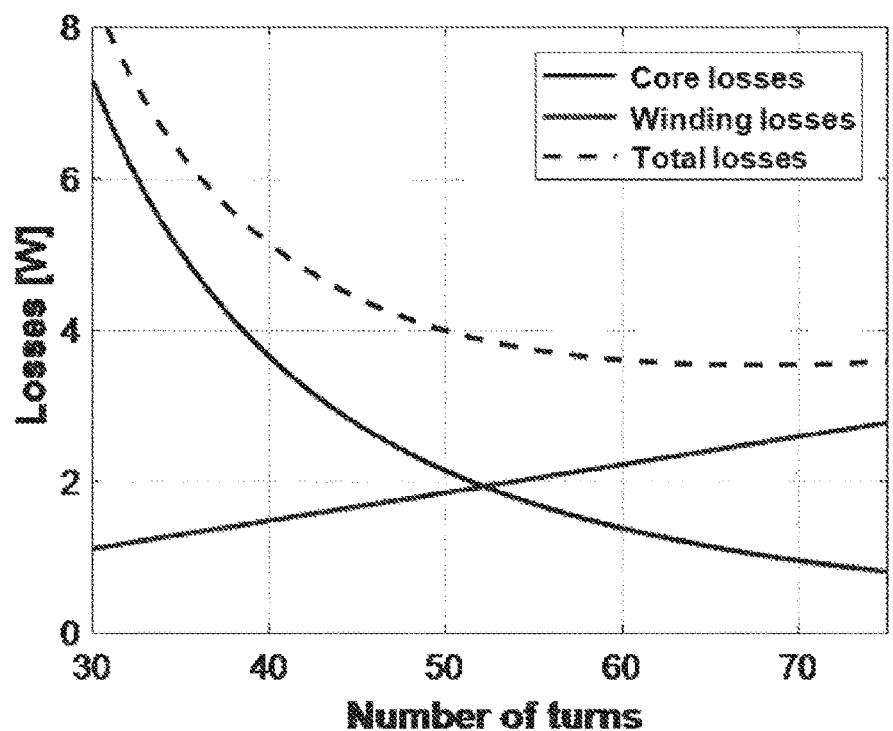
FIG. 9 shows simulated losses of an exemplary inductor of a resonant network of the class-DE converter, FIG. 10 simulated core losses at 1 MHz of the exemplary inductor of the resonant network of the class-DE converter FIG. 11—upper plot shows measured output power and conversion efficiency of an experimental prototype AC-DC power converter across its operational frequency range from 960 kHz to 1040 kHz, FIG. 11—lower plot shows measured PFC results of the experimental prototype AC-DC power converter across its operational frequency range from 960 kHz to 1040 kHz.

FIG. 9 shows inductor losses in the inductor LRES of the series resonant tank (214) vs. number of turns. Based on these estimates, LRES is preferably designed with about 52 turns, which helps distribute the losses evenly between the core and the windings and results in acceptable total losses. An airgap of 1.2 mm, distributed across the three legs of the core may be utilized to adjust the desired inductance. An experimental prototype of the AC-DC converter was implemented and assembled on a printed circuit board. Because of the charge pump circuit operation, high frequency AC current runs through the AC rectification circuit, or input bridge. The latter is therefore preferably implemented using four fast recovery diodes as rectification elements. With respect to selection of the high-side and low-side semiconductor switches $Q_{HS}$ and $Q_{LS}$ of the half-bridge 412 the inventors found gallium nitride FETs to show superior performance compared to the silicon super-junction and silicon carbide counterparts. However, the skilled person will appreciate that semiconductor switches may be used for the purpose based on design constraints imposed on any specific embodiment of the present AC-DC power converter. For the rectification circuit 416, including diodes $D_{R1}$ and $D_{R2}$, silicon carbide Schottky diodes may be employed because they show higher energy efficiency and thermal stability over the silicon counterparts.

Table III shows a breakdown of the incorporated power stage components of the experimental prototype AC-DC power converter.

TABLE III

| Component | Simulated | Prototype | Type |
|---|---|---|---|
| $L_{IN}$ | 100 µH | 100 µH SLF7045 | Inductor |
| $C_{IN}$ | 30 nF | 2 * 15 nF | Ceramic (COG) |
| Diode Bridge | | 4*ESH1GMRSG | Si Fast Recovery |
| $C_{DC}$ | 10 µF | 1 * 10 µF 3 * 0.1 µF | Electrolytic Ceramic (COG) |
| $D_P$ | | RF201LAM4S | Si Fast Recovery |
| $C_P$ | 1.36 nF | 2 * 680 pF | Ceramic (COG) |
| $Q_{HS}$, $Q_{LS}$ | | GS66502B | GaN Switches |
| $L_{RES}$ | 156 µH | 152 µH | Custom design |
| $C_{RES}$ | 188 pF | 220 pF | Ceramic (COG) |
| $D_{R1}$, $D_{R2}$ | | GB01SLT06-214 | SiC Schottky |
| $C_{OUT}$ | 30 nF | 2 * 15 nF | Ceramic (COG) |

The experimental prototype AC-DC power converter was tested for operation from a mains voltage of 230 $V_{RMS}$ and running at converter switching frequencies between 0.96 MHz and 1.04 MHz. The latter frequency range lies within an inductive mode of operation for the resonant converter such that soft-switching operation, i.e. ZVS, of the class DC inverter was achieved.

Figure 11:
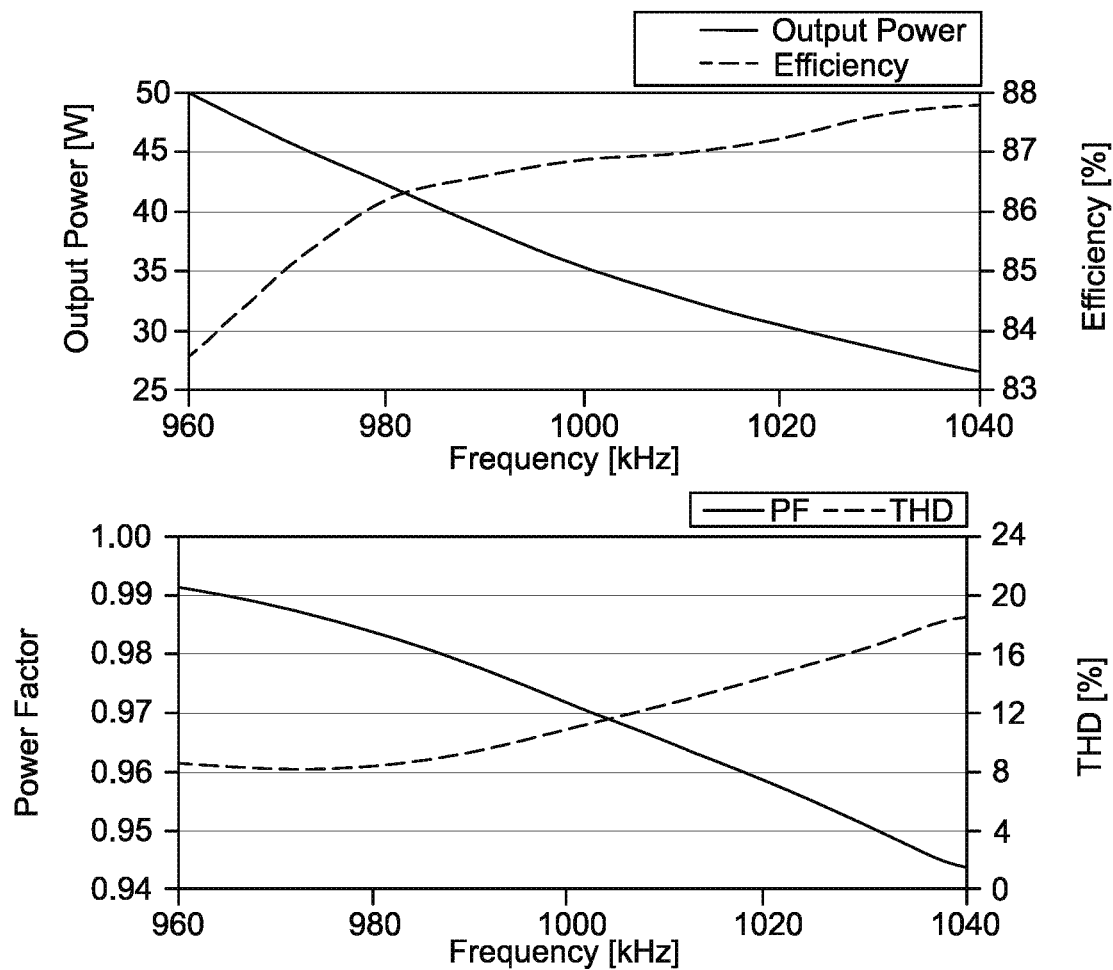

FIG. 11 (top plot) shows the measured output power (left scale) and conversion efficiency (right scale) across the operational frequency range from 960 kHz to 1040 kHz of the experimental prototype AC-DC power converter. The depicted measurement results illustrate how output power modulation or control is achieved from 26 W to 50 W of output power through control of the switching frequency. At the same time a peak efficiency of 87.9% at 1.04 MHz switching frequency is achieved.

FIG. 11 (bottom plot) shows measured PFC results of the experimental prototype AC-DC power converter. The PFC results exhibit a peak power factor of 0.99 and minimum THD of 8.6% at an output power of 50 W and switching frequency of 960 kHz. The measured data shows that operation at lower frequencies, close to resonance of the series resonant tank with higher gain achieves higher power factor and lower THD. This is consistent with the analysis given in the previous sections.

Figure 12:
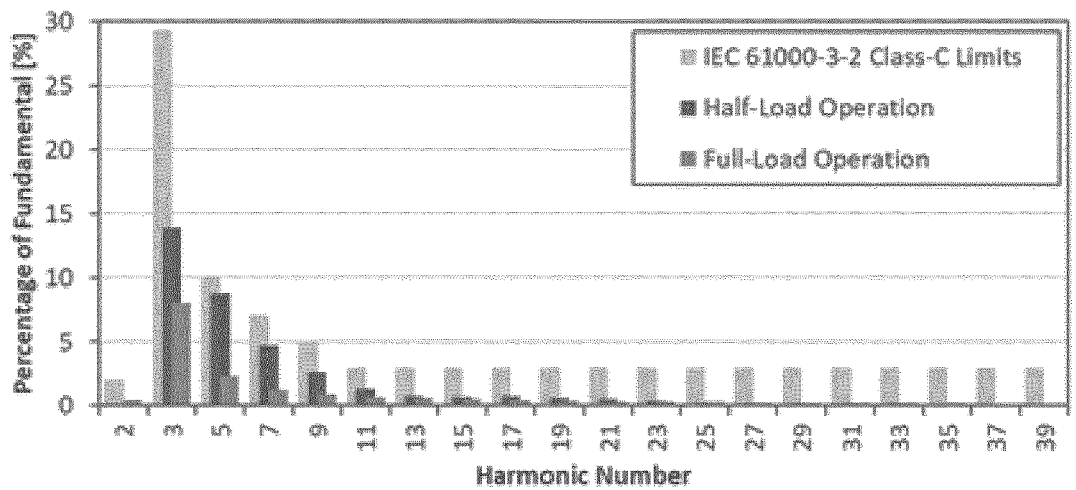
FIG. 12 shows measured harmonics distribution of the mains line current at full-load operation and half-load operation of the experimental prototype AC-DC power converter.

FIG. 12 shows measured harmonics distribution of the mains line current at full-load operation and at half-load operation of the experimental prototype AC-DC power converter where THD figures of 8.6% and 17.4% are measured, respectively. Since one of the potential applications for the proposed converter is the rectifier or rectification circuit or stage in LED drivers, the figure illustrates the harmonics magnitudes against the IEC 61000-3-2 standard class-C device limits [1][2], where the histogram shows that the measured harmonics magnitudes are well-within the limits set by the IEC standard.

Figure 13:
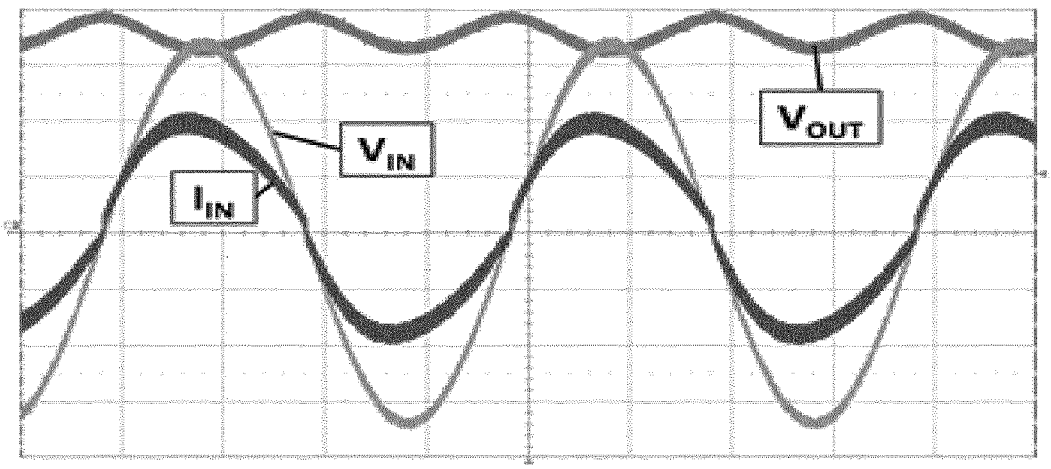
FIG. 13 shows line-frequency time domain waveforms of the experimental prototype AC-DC power converter.

FIG. 13 shows line-frequency time domain waveforms of the experimental prototype AC-DC power converter. The experimental prototype AC-DC power converter is delivering an output or load power of 12.8 W and has a measured power factor of 0.99 and a THD of 9.1% for an average DC output voltage of 179 V with 20 V low-frequency ripple as illustrated by the $V_{OUT}$ waveform.

Figure 14:
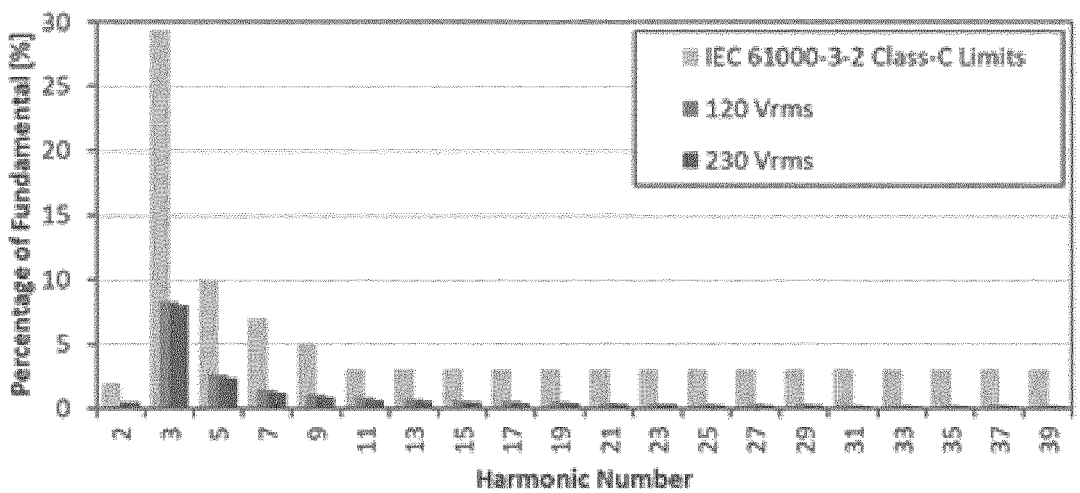
FIG. 14 shows measured harmonics distribution of the mains line current for the experimental prototype AC-DC power converter at 120 V_RMS and 230 V_RMS line voltage inputs.

FIG. 14 shows measured harmonics distribution of the mains line current for the experimental prototype AC-DC power converter at 120 V_RMS and 230 V_RMS line voltage inputs against the IEC 61000-3-2 standard class-C device limits [1][2]. FIGS. 13 and 14 illustrate that a high power factor and low THD of the prototype AC-DC power converter are achieved with different line input voltages as the charge pump circuit works in the same manner.

REFERENCES

[1] IEC 61000-3-2, Fifth Edition, International Electrotechnical Commission, 2018.
[2] EN 61000-3-2, European Committee for Electrotechnical Standardization, 2014.
[3] X. Xie, C. Zhao, L. Zheng and S. Liu, "An Improved Buck PFC Converter With High Power Factor," in *IEEE Transactions on Power Electronics*, vol. 28, no. 5, pp. 2277 ¬2284, May 2013.
[4] X. Wu, J. Yang, J. Zhang and M. Xu, "Design Considerations of Soft-Switched Buck PFC Converter With Constant On-Time (COT) Control," in *IEEE Transactions on Power Electronics*, vol. 26, no. 11, pp. 3144-3152, November 2011.
[5] D. C. Marian, K. Kazimierczuk, Resonant Power Converters, 2nd Edition ed., Wiley-IEEE Press, 2011.
[6] Ferroxcube material datasheet https://www.ferroxcube.com/upload/media/design/FXCStain metzCoefficients.xls.
[7] Micrometals material datasheet https://micrometalsarnoldpowdercores.com/pdf/mix/Mix-6-DataSheet.pdf.

The invention claimed is:

1. An AC-DC power converter comprising:
an AC rectification circuit configured to convert an AC line voltage into a rectified line voltage,
a rectifying element connected between the rectified line voltage and a DC supply voltage of a resonant DC-DC converter; said resonant DC-DC converter comprising:
a resonant inverter configured to convert the DC supply voltage into a resonant inverter voltage at a fixed or controllable switching frequency, and
an output rectification circuit configured to generate a DC output voltage or DC output current from the resonant inverter voltage for supply to a converter load, and
a charge pump circuit connected to the rectified line voltage and the resonant inverter voltage, where said charge pump circuit is configured to draw current pulses at the switching frequency from the AC line voltage,
wherein electrical charges of the current pulses vary proportionally to instantaneous amplitude of the AC line voltage,
wherein the charge pump circuit comprises:
a smoothing capacitor connected to the DC supply voltage of the resonant DC-DC converter, and
a pump or flying capacitor connected from the resonant inverter voltage to the rectified line voltage,
wherein the charge pump circuit is configured to, during a cycle of the switching frequency, sequentially cycle through states of:
a first state where each of the rectifying element and the AC rectification circuit is non-conducting/off and a voltage across the pump/flying capacitor remains substantially constant,
a second state where the AC rectification circuit is conducting/on and the rectifying element is non-conducting/off to charge the pump/flying capacitor by line current drawn from the AC line voltage,
a third state where each of the rectifying element and the AC rectification circuit is non-conducting/off and the voltage across the pump/flying capacitor remains substantially constant, and
a fourth state where the AC rectification circuit is in a non-conducting/off state and the rectifying element is in a conducting/on state such that discharge current flows from the pump/flying capacitor into the smoothing capacitor to increase the DC supply voltage of the resonant inverter and decrease the voltage across the pump/flying capacitor;
wherein the charge pump circuit is further configured to:
cycle through its second state during a rising edge of a waveform of the resonant inverter voltage, and
cycle through its fourth state during a falling edge of the waveform of the resonant inverter voltage; and
wherein a capacitance of the smoothing capacitor and a capacitance of the pump/flying capacitor are selected such that the DC supply voltage of the resonant inverter is higher than the AC line voltage across an entire cycle of the AC line voltage.

2. The AC-DC power converter according to claim 1, further comprising:
a voltage or current regulation loop configured to adjust the DC output voltage or DC output current in accordance with a DC reference voltage or a DC reference current.

3. The AC-DC power converter according to claim 2, wherein the voltage or current regulation loop is configured to:
adjust the DC output voltage or DC output current by adjusting the controllable switching frequency, and/or
adjust the DC output voltage or DC output current by off/on duty cycle modulation of the fixed or controllable switching frequency.

4. The AC-DC power converter according to claim 1, wherein the resonant inverter comprises at least one semiconductor switch connected between the DC supply voltage and a negative supply rail;
said at least one semiconductor switch comprising one or more wide bandgap transistors such as one or more gallium nitride FET(s).

5. The AC-DC power converter according to claim 4, wherein a switch signal, at the fixed or controllable switching frequency, is applied to a control terminal of the least one semiconductor switch of the resonant inverter.

6. The AC-DC power converter according to claim 1, wherein the resonant inverter and/or the output rectification circuit of the resonant DC-DC converter is configured for zero voltage switching (ZVS) and/or zero current switching (ZCS).

7. The AC-DC power converter according to claim 1, wherein the output rectification circuit comprises one or more passive diodes, or one or more active/controllable diodes.

8. The AC-DC power converter according to claim 1, wherein the resonant inverter comprises a series resonant network and/or a parallel resonant network having a predetermined resonance frequency.

9. The AC-DC power converter according to claim 1, wherein the switching frequency is between 100 kHz and 300 MHz.

10. The AC-DC power converter according to claim 1, further comprising galvanic isolation barrier coupled between the resonant inverter and an input of the output rectification circuit.

11. A method of applying power factor correction to an AC-DC power converter using a charge pump circuit, said method comprising steps of:
   converting an AC line voltage into a rectified line voltage,
   applying the rectified line voltage to a DC supply voltage of a resonant DC-DC converter through a rectifying element,
   generating a resonant inverter voltage by switching a resonant inverter at a fixed or controllable switching frequency,
   rectifying the resonant inverter voltage to generate a DC output voltage or DC output current,
   drawing charging pulses, at the switching frequency, from the AC line voltage into a pump or flying capacitor connected between the rectified line voltage and the resonant inverter voltage, wherein electrical charges of the charging pulses vary proportionally to an instantaneous amplitude of the AC line voltage, and
   discharging the pump or flying capacitor into a smoothing capacitor, connected to the DC supply voltage, by supplying current pulses, at the switching frequency, into the smoothing capacitor,
wherein the charge pump circuit comprises:
   the smoothing capacitor connected to the DC supply voltage of the resonant DC-DC converter, and
   the pump or flying capacitor connected from the resonant inverter voltage to the rectified line voltage,
wherein the charge pump circuit is configured for, during a cycle of the switching frequency, sequentially cycling through states of:
   a first state where each of the rectifying element and the AC rectification circuit is non-conducting/off and a voltage across the pump/flying capacitor remains substantially constant,
   a second state where the AC rectification circuit is conducting/on and the rectifying element is non-conducting/off to charge the pump/flying capacitor by line current drawn from the AC line voltage,
   a third state where each of the rectifying element and the AC rectification circuit is non-conducting/off and the voltage across the pump/flying capacitor remains substantially constant, and
   a fourth state where the AC rectification circuit is in a non-conducting/off state and the rectifying element is in a conducting/on state such that discharge current flows from the pump/flying capacitor into the smoothing capacitor to increase the DC supply voltage of the resonant inverter and decrease the voltage across the pump/flying capacitor;
wherein the charge pump circuit is further configured for:
   cycling through its second state during a rising edge of a waveform of the resonant inverter voltage, and
   cycling through its fourth state during a falling edge of the waveform of the resonant inverter voltage; and
wherein a capacitance of the smoothing capacitor and a capacitance of the pump/flying capacitor are selected such that the DC supply voltage of the resonant inverter is higher than the AC line voltage across an entire cycle of the AC line voltage.

\* \* \* \* \*